United States Patent
Wang et al.

(10) Patent No.: US 8,303,845 B2
(45) Date of Patent: Nov. 6, 2012

(54) POROUS PHOSPHOR, MANUFACTURING METHOD OF THE POROUS PHOSPHOR, AND LIGHTING DEVICE COATED WITH THE POROUS PHOSPHOR

(75) Inventors: Sue-Lein Wang, Hsinchu (TW); Pei-Ci Jhang, Hsinchu (TW)

(73) Assignee: National Tsing Hua University, Taiwan (TW)

( * ) Notice: Subject to any disclaimer, the term of this patent is extended or adjusted under 35 U.S.C. 154(b) by 409 days.

(21) Appl. No.: 12/588,325

(22) Filed: Oct. 13, 2009

(65) Prior Publication Data

US 2010/0314992 A1   Dec. 16, 2010

(30) Foreign Application Priority Data

Jun. 12, 2009   (TW) ............................... 98119814 A

(51) Int. Cl.
*C09K 11/00*   (2006.01)
(52) U.S. Cl. .................. 252/301.16; 313/486
(58) Field of Classification Search ............. 252/301.16; 313/486
See application file for complete search history.

(56) References Cited

OTHER PUBLICATIONS

Jhang et al, "A Fuly Integrated Nanotubular Yellow-Green Phosphor from an Environmentally Friendly Eutectic Solvent", Angew. Chem. Ind. Ed. 48, Dec. 12, 2008, p. 742-745.*

Jhang et al, Pei-Ci; A Fully Integrated Nanotubular Yellow-Green Phosphor from an Environmentally Friendly Eutectic Solvent, Angew. Chem. Int. Ed. 2009, 48, 742-745, 2009 Wiley-VCH Verlag GmbH & Co., KgaA, Weinheim.

Jhang et al, P.C.; Communications Luminescent Metal Phosphites, Angew. Chem. Int. Ed. 2008, 47, 15 pages, 2008 Wiley-VCH Verlag GmbH & Co., KgaA, Weinheim.

Liao et al., Yueh-Chun, Direct White Light Phosphor: A Porous Zinc Gallophosphate with Tunable Yellow-to-White Luminescence, J. Am. Chem. Soc. 2005, 127, 9986-9987, American Chemical Society 2005.

Yang et al., Ya-Ching,Intrinsic Yellow Light Phosphor: An Organic-Inorganic Hybrid Gallium Oxalatophosphate wtih Hexameric Octahedral $Ga_6(OH)_4O_{26}$ Cluster, J. Am. Chem. Soc. 2008, 130, 1146-1147, American Chemical Society 2008.

* cited by examiner

*Primary Examiner* — Carol M Koslow
(74) *Attorney, Agent, or Firm* — Bacon & Thomas, PLLC

(57) ABSTRACT

The present invention discloses a porous phosphor and manufacturing method of the same. The method includes manufacturing an organic-inorganic hybrid porous structure from solution comprising deep eutectic solvent, the $13^{th}$ group metal source, phosphorous acid source, and counter species source. With 4,4'-trimethylenedipyridine, the structure can be used as an intrinsic phosphor owning properties of photoluminescence without doping additional activator. The present invention also discloses a lighting device coated with the porous phosphor.

14 Claims, 13 Drawing Sheets

POROUS PHOSPHOR, MANUFACTURING METHOD OF THE POROUS PHOSPHOR, AND LIGHTING DEVICE COATED WITH THE POROUS PHOSPHOR

FIELD OF THE INVENTION

The present invention is generally related to the field of phosphor and, more particularly, to the intrinsic porous phosphor.

DESCRIPTION OF THE PRIOR ART

Research into the synthesis of porous (nanoporous) material has progressed faster than ever in the last twenty years. A series of functionalized compounds NTHU-n (n=1 to 6) named by National Tsing Hua University (NTHU) are the extraordinary landmarks in the field, wherein NTHU-4 is a gallium zinc phosphate comprising two analogues, NTHU-4W and NTHU-4Y, which emit white light and yellow light, respectively; and NTHU-6 is an organic-inorganic hybrid gallium oxalatophosphate that can be utilized as yellow phosphor having high quantum efficiency.

The two metal phosphates, NTHU-4 and NTHU-6, are different with conventional color-conversion phosphor doping metal activators. NTHU-4 and NTHU-6 comprise nanoporous structure with no metal activators or any form of conventional chromophores but still could emit intense yellow light with excitation of near-ultraviolet (NUV) and/or blue light. The intrinsic photoluminescence (PL) property has broadened the field of the color-conversion phosphors.

However, the prior art utilizes neither the environmentally friendly deep eutectic solvent (DES) for synthesizing nanoporous structure nor the phosphite for synthesizing metal oxalatophosphite compound. Therefore, the present invention provides a novel method for manufacturing a novel metal phosphate comprising nanotubular nanoporous structure. The present invention also provides a phosphor produced by utilizing the above-mentioned structure. Both the manufacturing method and the structure of the phosphor are different with the prior art, and the phosphor further provides unexpected effect compared to the prior art.

SUMMARY OF THE INVENTION

In one aspect of the present invention, a porous phosphor is provided. The porous phosphor comprises the following composition: $(A)_{1-2x}(B)_x[M_2(HPO_3)_2(C_2O_4)(OH)(H_2O)] \cdot y(H_2O)$; wherein $0<x<0.5$; $0<y<2$; A is choline ion; B is protonated organic amine; and M is $13^{th}$ group metal ion.

In another aspect of the present invention, a porous phosphor is provided. The porous phosphor comprises: a host structure, comprising a plurality of ribbons structures comprising alternate $13^{th}$ group metal ions and phosphite groups, the plurality of ribbons are connected to one another through a plurality of oxalate ligands; and at least one protonated organic amine placed within the host structure In still another aspect of the present invention, a method for manufacturing porous phosphor is provided. The method comprises: preparing solution comprising deep eutectic solvent, $13^{th}$ metal source, phosphorous acid source, and organic amine source; and heating the solution at temperature about 140 to 180° C. to get product; wherein the deep eutectic solvent comprising mixture of choline chloride and oxalic acid dihydrate; the porous phosphor comprising the following composition: $(A)_{1-2x}(B)_x[M_2(HPO_3)_2(C_2O_4)(OH)(H_2O)] \cdot y(H_2O)$; wherein $0<x<0.5$; $0<y<2$; A is choline ion; B is protonated organic amine; and M is $13^{th}$ group metal ion.

In further another aspect of the present invention, a lighting device coated with porous phosphor is provided. The lighting device comprises: at least one light source; and at least one phosphor layer formed on the at least one light source, wherein the at least one phosphor layer comprises porous phosphor comprising the following composition: $(A)_{1-2x}(B)_x[M_2(HPO_3)_2(C_2O_4)(OH)(H_2O)] \cdot y(H_2O)$; wherein $0<x<0.5$; $0<y<2$; A is choline ion; B is protonated organic amine; and M is $13^{th}$ group metal ion.

By referring the following description and illustration of the embodiments of the present invention and the accompanying figures, the advantages and the spirit of the present invention can be better understood.

DESCRIPTION OF THE PREFERRED EMBODIMENT

Figure 6:
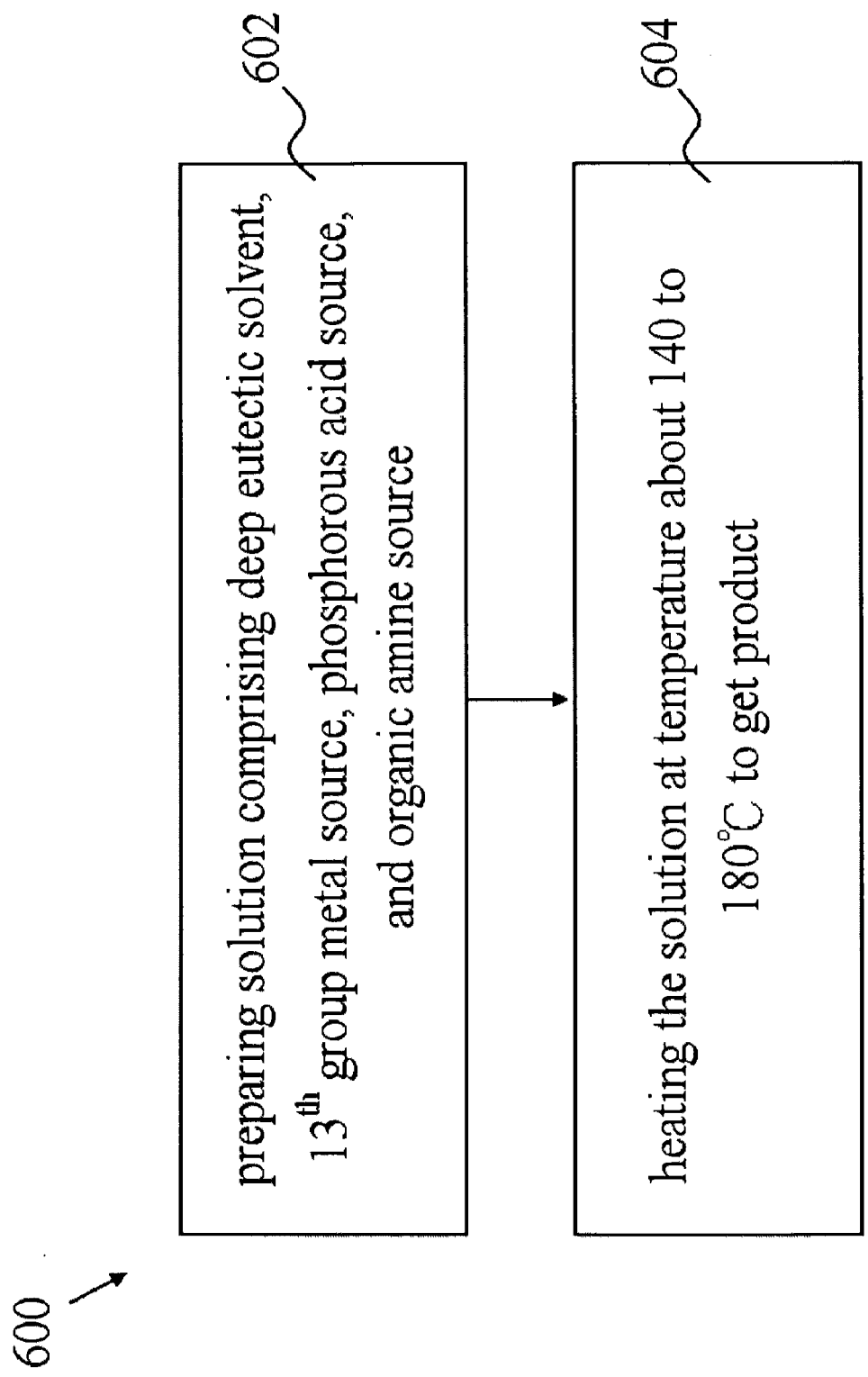
FIG. 6 illustrates the method for manufacturing porous phosphor.

A method for manufacturing porous (nanoporous) phosphor is provided according to the embodiments of the present invention, as shown in FIG. 6. In FIG. 6, the method 600 comprises: in step 602, preparing solution comprising deep eutectic solvent, 13th group metal source, phosphorous acid source, and organic amine source; and in step 604, heating the solution at temperature about 140 to 180° C. to get product. The porous phosphor comprises the following composition: $(A)_{1-2x}(B)_x[M_2(HPO_3)_2(C_2O_4)(OH)(H_2O)] \cdot y(H_2O)$; wherein $0<x<0.5$; $0<y<2$; A is choline ion; B is protonated organic amine and M is $13^{th}$ group metal ion. In one embodiment, the method utilizes a solution comprising deep eutectic solvent (DES), $13^{th}$ group metal source, phosphorous acid, and 4,4'-trimethylenedipyridine (tmdp) to manufacture a organic-inorganic hybrid nanoporous phosphor. In the preferred embodiment of the present invention, the $13^{th}$ group metal source may be selected as gallium oxide, while the composition of the DES may comprise transparent colorless solid choline chloride ($Ch^+Cl^-$, m.p. is about 302° C.) mixed with white solid oxalic acid dihydrate ($H_2C_2O_4 \cdot 2H_2O$, m.p. is about 102° C.). When the two organic solids are mixed in about 1:1 molar ratio, miscibility could be achieved completely under ambient conditions to form a water containing DES. The liquefaction is a rapid endothermic process, with the temperature dropping to about 10° C., which resulted in the formation of a eutectic liquid. In a preferred embodiment, the nanoporous product is obtained from a mixture comprising tmdp (0.4 g, 2 mmol), gallium oxide (0.187 g, 1 mmol), phosphorous acid (0.41 g, 5 mmol), and water containing DES of choline chloride/oxalic acid dihydrate (1:1, 5.3 g, 20 mmol), which is heated in a 23 ml teflon-lined autoclave at about 160° C. for about 1 day, and the yield of the nanoporous product is about 56%. For brevity, the above-mentioned nanoporous product is referred as "NTHU-7". The specific amount of water within the DES (about 13.5 wt % from the component $H_2C_2O_4 \cdot 2H_2O$) is critical and created the optimal condition for the formation of NTHU-7. In another embodiment of the present invention, by replacing gallium oxide with aluminum oxide, the product containing aluminum can be made by steps similar to the above-mentioned steps. In the preferred embodiment, the product containing aluminum is carried out by a mixture comprising tmdp (0.6 g, 3 mmol), aluminum oxide (0.2 g, 2 mmol), phosphorous acid (0.492 g, 6 mmol), and water containing DES of choline chloride/oxalic acid dihydrate (1:1, 5.3 g, 20 mmol).

Figure 1A:
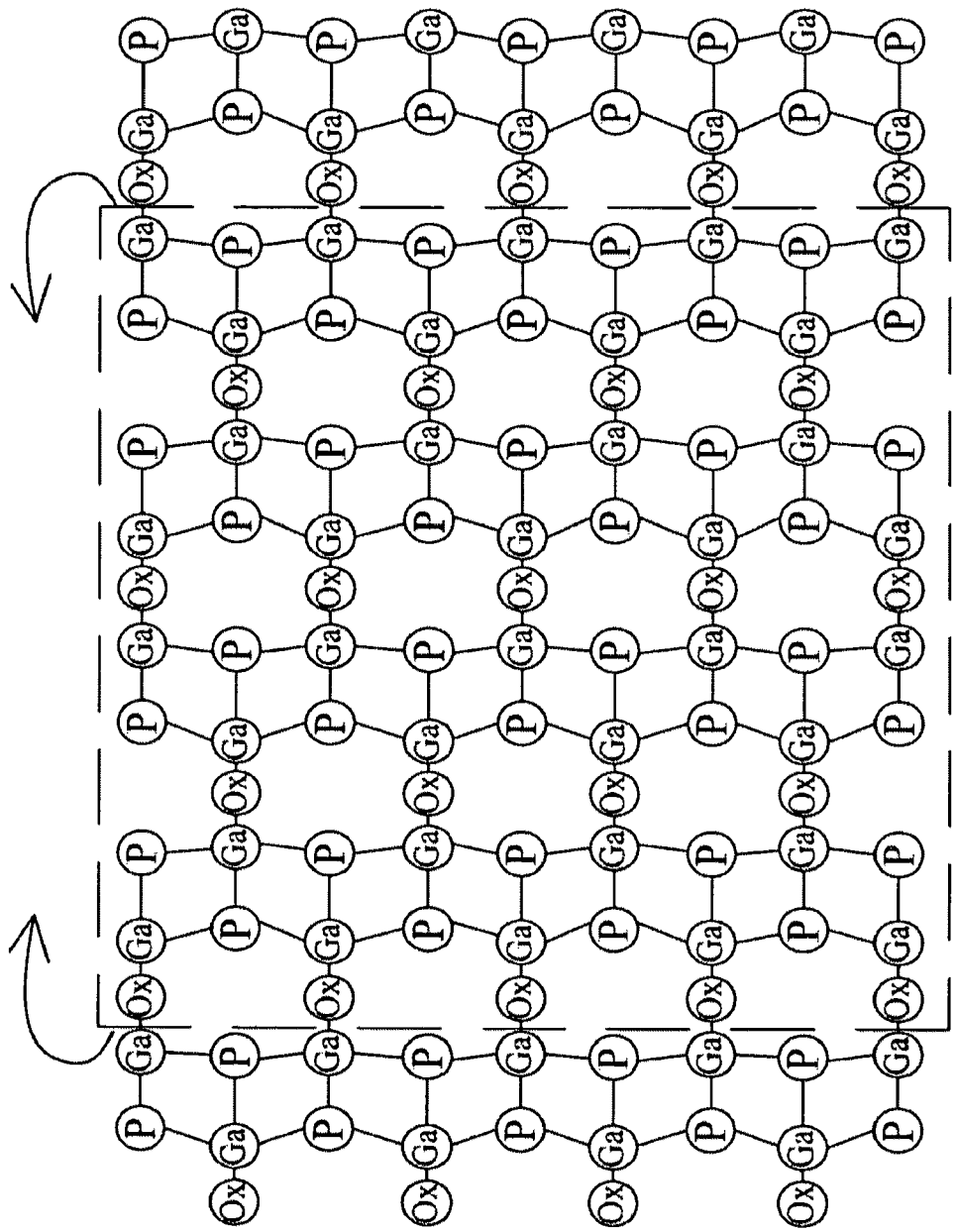
FIGS. 1A and 1B illustrate porous host structure of NTHU-7 according to the embodiments of the present invention.
Figure 1B:
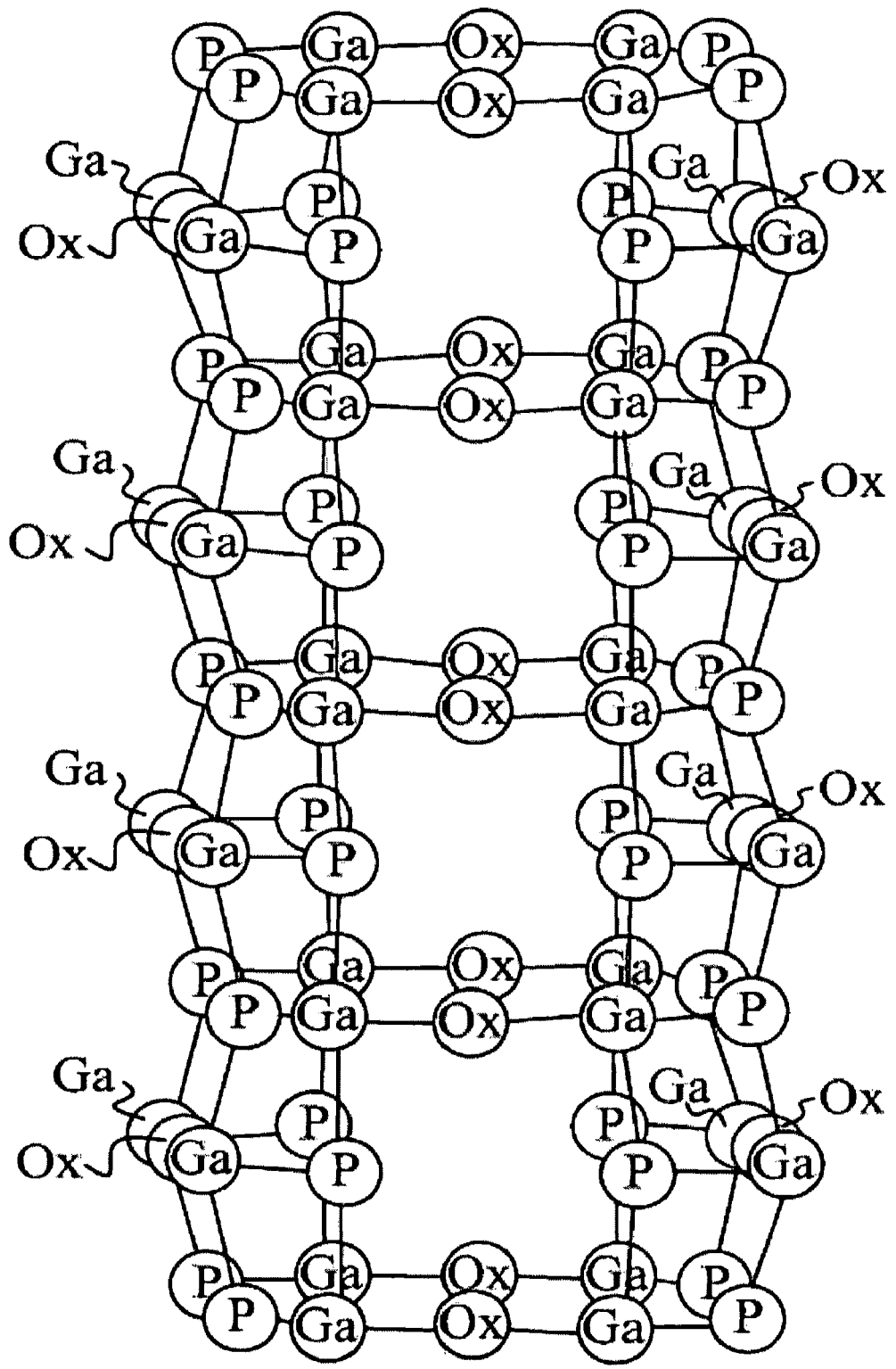
Figure 2A:
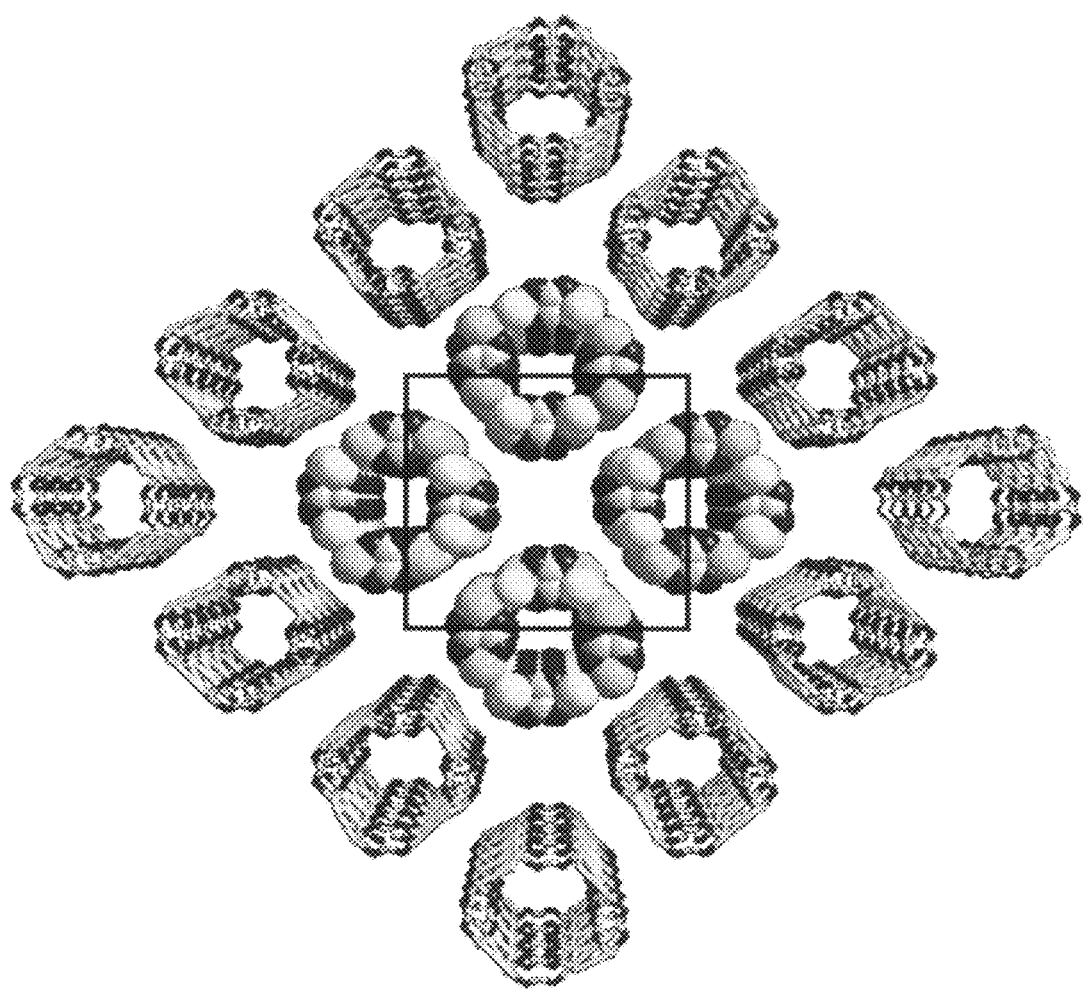
FIGS. 2A and 2B illustrate porous host structure of NTHU-7 according to the embodiments of the present invention.
Figure 2B:
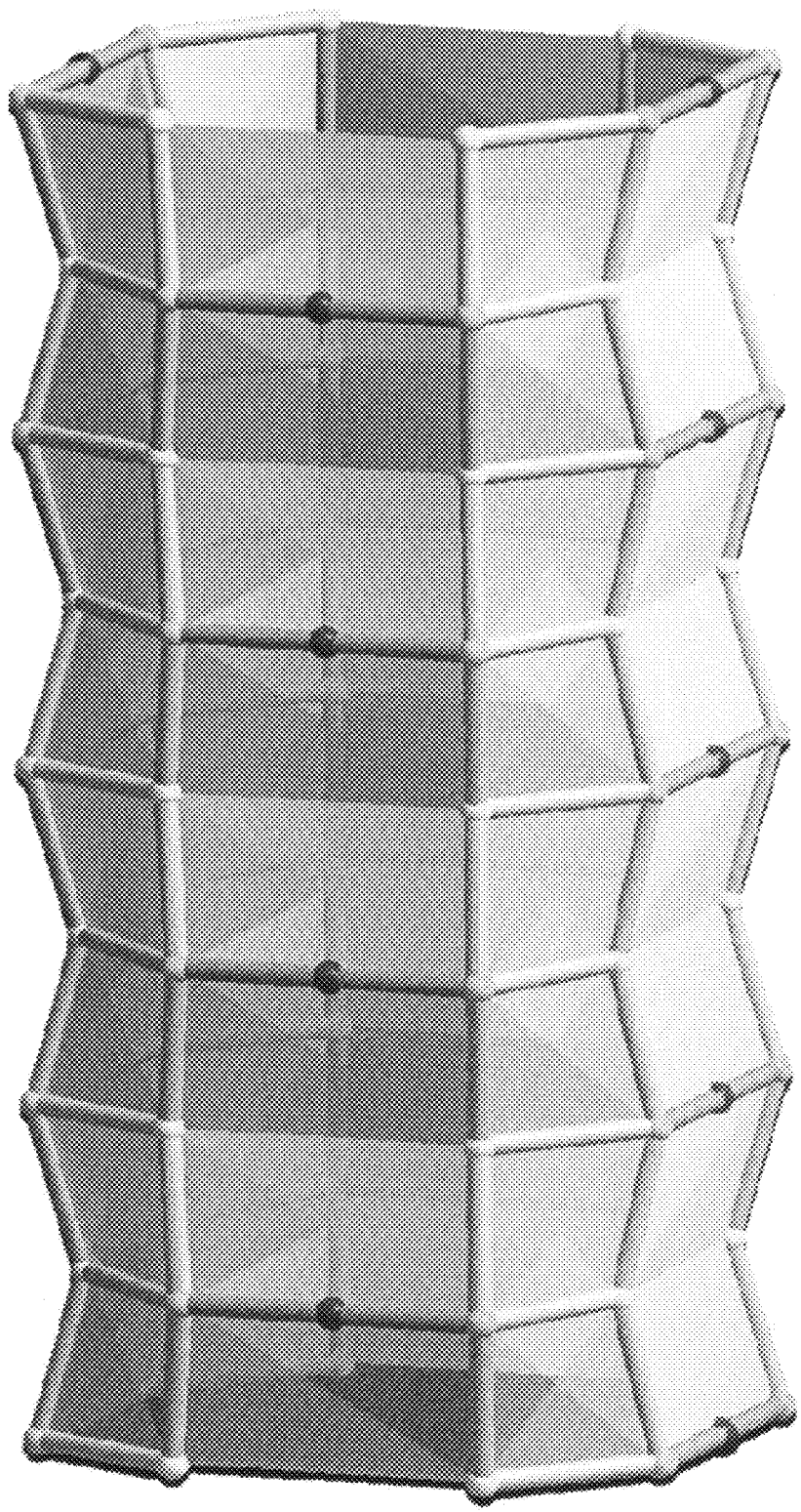
Figure 3A:
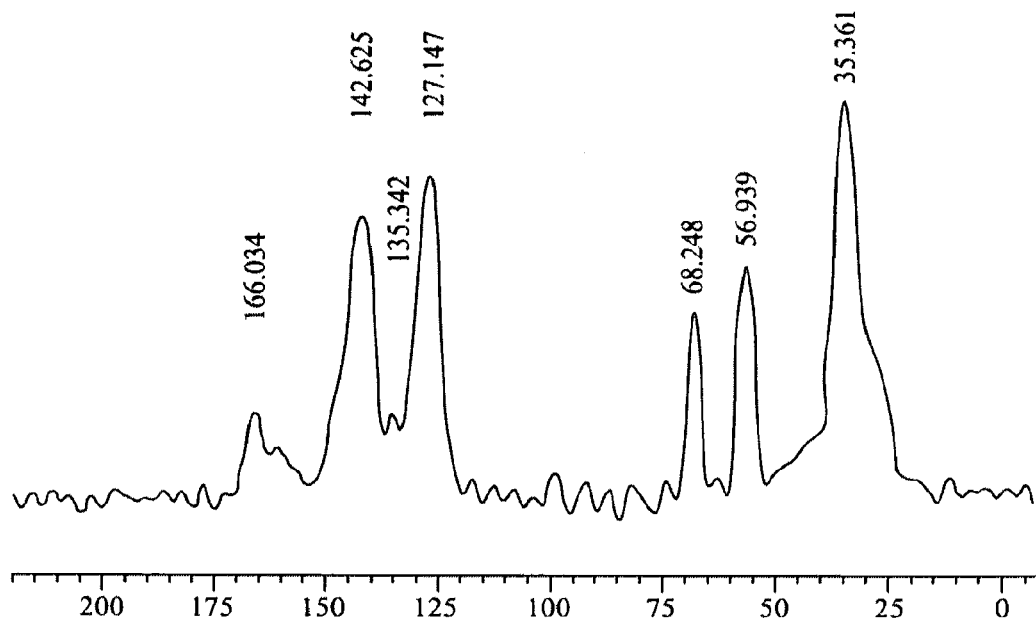
FIGS. 3A through 3F illustrate $^{13}C$ NMR spectra for NTHU-7 and the polymorphs/analogues of NTHU-7.
Figure 3B:
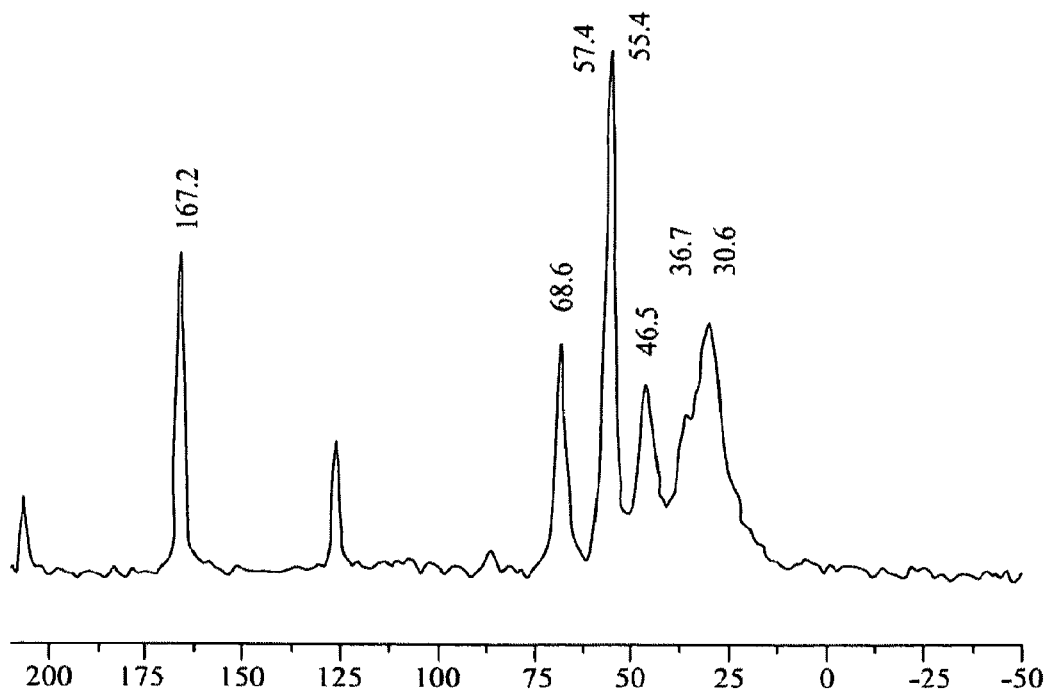
Figure 3C:
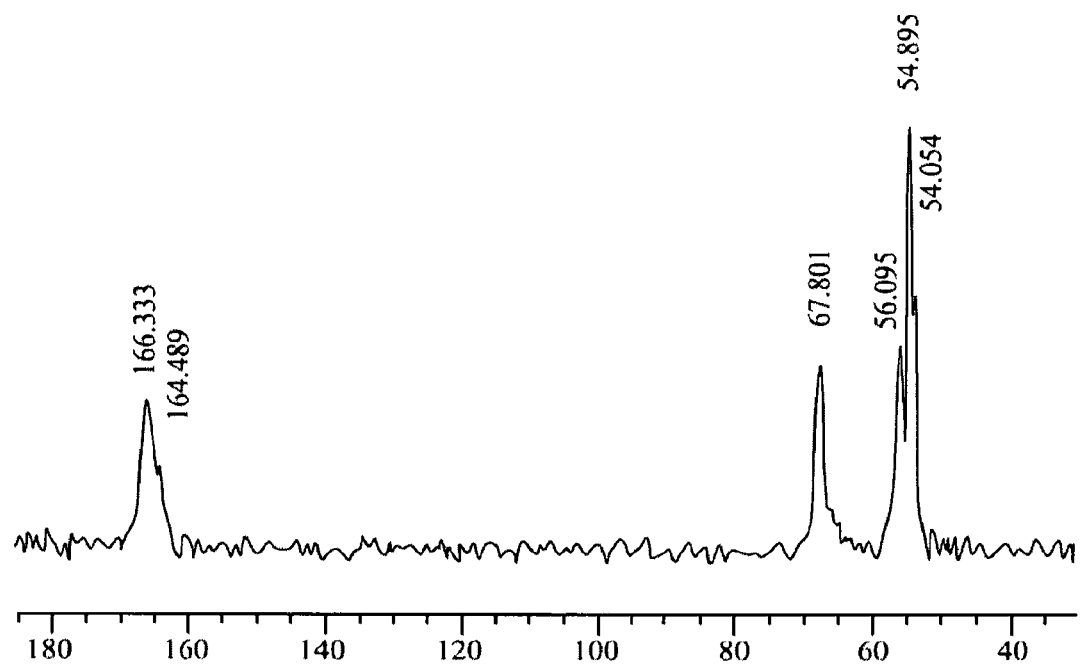
Figure 3D:
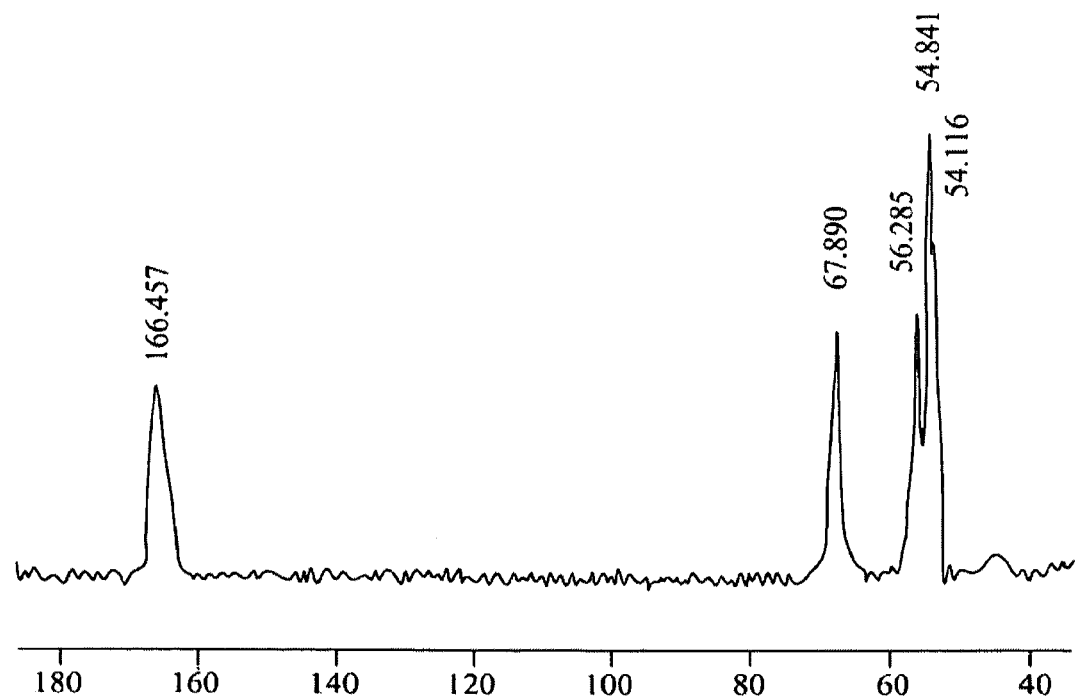
Figure 3E:
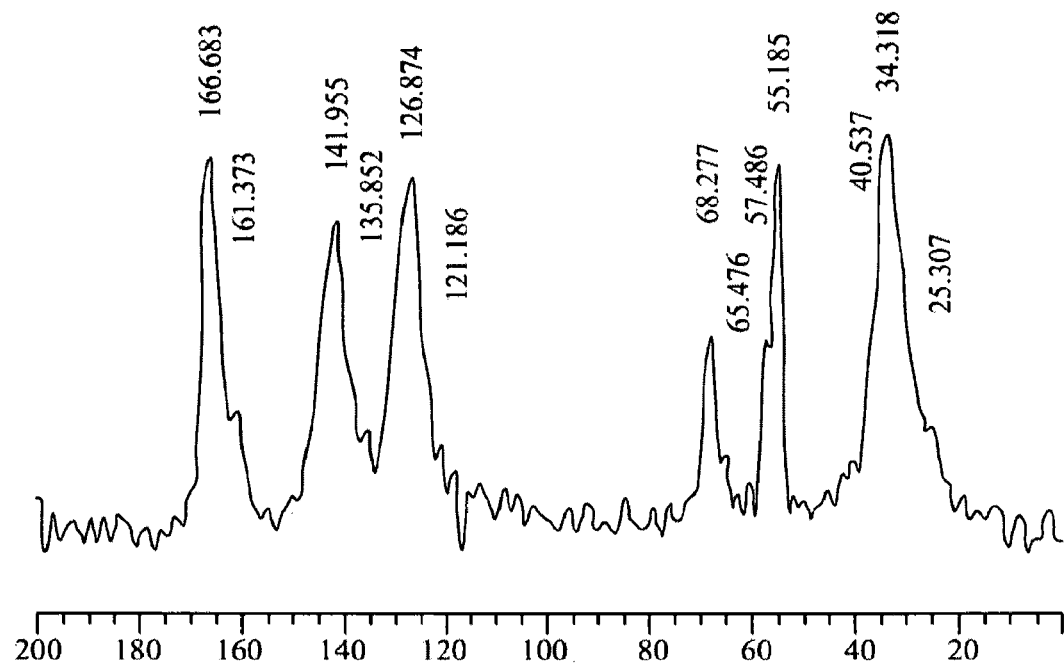
Figure 3F:
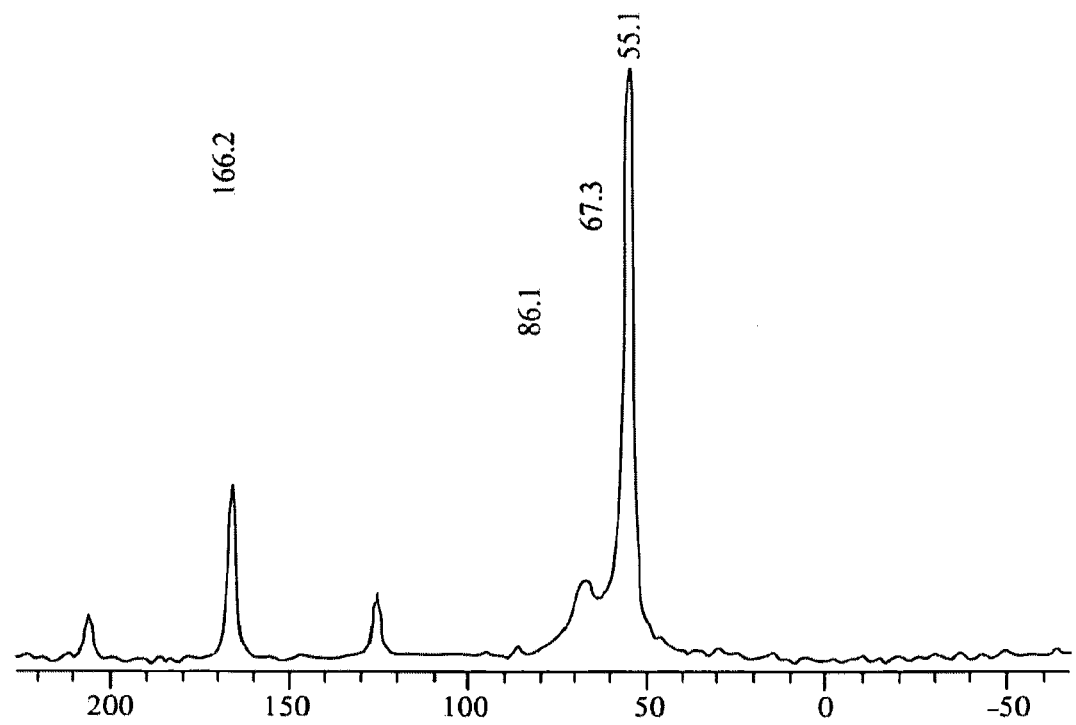

The product, NTHU-7, generated by the above-mentioned steps comprises a porous host structure and counterion species, wherein the porous host structure is illustrated by FIGS. 1A and 1B. For brevity, the porous host structure of NTHU-7 is showed as a two-dimensional structure in FIG. 1A. Further, the porous host structure is showed in duplication for facilitating to understand the connection between the components inside the porous host structure. The square mark illustrated in FIG. 1 emphasizes the part that is sufficient to form the porous host structure of NTHU-7, wherein the arrow marks indicate folding to form a nanotube. For the structure being better understood, the structure can be viewed as four ribbons each comprising alternate "P balls" and "Ga balls", wherein a P ball indicates the position of a phosphorus atom (for brevity, only phosphorus atom is showed) and a Ga ball indicates the position of a gallium atom (for brevity, only gallium atom is showed). The chemical composition of the ribbon can be further expressed as $[Ga_2(HPO_3)_2]$, but it is only one preferred embodiment of the present invention. In other embodiments of the present invention, the chemical composition can be further generalized as $[M_a(HPO_3)_b]^{c-}$, wherein M indicates $13^{th}$ group metal ion, $HPO_3$ indicates phosphite group, a and b are natural numbers, and c is integer or zero. The ribbons are connected to one another through oxalate ligands, wherein the positions of oxalate ligands are showed as "Ox ball" (for brevity, only the middle point of the two carbon atoms of each oxalate ligand is showed). The framework of the nanoporous nanotubule comprises $GaO_6$ octahedra, $HPO_3$ pseudo-tetrahedra, and bis(bidentate oxalate) $(C_2O_4^{2-})$ groups, and different windows such as sixteen-ring (16R), eight-ring (8R), and four-ring (4R) windows can be observed upon the nanoporous nanotubule. However, it should be appreciated that the above description is for the purpose of providing thoroughly understanding of the porous host structure of NTHU-7 but not for limiting the NTHU-7 with some specific reaction mechanisms. Further, FIG. 1B illustrates the topological representation of one nanotubule structure of NTHU-7, wherein some components (balls) are overlapped and thus the corresponding symbols are labeled on adjacent positions. Furthermore, the porous host structure of NTHU-7 drawn according to data of single-crystal X-ray structure analysis is shown in FIGS. 2A and 2B, wherein the plurality of nanotubules of NTHU-7 shown in FIG. 2A are arranged in square-packing patterns. The square mark shown in FIG. 2A is making for confirming the packing pattern of the nanotubules of NTHU-7. In the other hand, FIG. 2B shows the structure of single nanotubule of NTHU-7, and the chemical composition estimated by single-crystal X-ray structural analysis is $[Ga_2(HPO_3)_2(C_2O_4)(OH)(H_2O)^-]$. It should be noted that although the oxalic acid is used in the preferred embodiments of the present invention, the oxalic acid is not the only choice. In the other embodiments of the present invention, the portion of oxalic acid in the chemical composition can be generalized as the form of $H_{2q}C_mO_{2n}$, wherein H means hydrogen, O means oxygen, and q, m, and n are natural numbers, respectively. The oxalic acid can thus be replaced by carboxylic acid and its derivatives. Further, the external diameter of above-mentioned nanotubule is about 16.3 Å, and the internal diameter of it is about 8.0 Å. Furthermore, the negative charge provided by the nanotubule is balanced by the counterion species which are listed in TAB. 1.

TABLE 1

| Compound | Counterion Species | Structure Type |
| --- | --- | --- |
| NTHU-7 | $(Ch^+)_{0.5}(H_2tmdp^{2+})_{0.25}(H_2O)_{0.5}$ | Tubule |
| tmdpp-NTHU-7 | $(Ch^+)_{0.9}(H_2tmdpp^{2+})_{0.05}(H_2O)_{0.5}$ | Tubule |
| Cs-NTHU-7 | $(Ch^+)_{0.7}(Cs^+)_{0.8}(Cl^-)_{0.5}(H_2O)_{0.5}$ | Tubule |
| Rb-NTHU-7 | $(Ch^+)_{0.6}(Rb^+)_{0.9}(Cl^-)_{0.5}(H_2O)_{0.5}$ | Tubule |
| K-NTHU-7 | $(Ch^+)_{0.7}(K^+)_{0.7}(Cl^-)_{0.4}(H_2O)_{0.5}$ | Tubule |
| Na-NTHU-7 | $(Ch^+)_{0.7}(Na^+)_{0.5}(Cl^-)_{0.2}(H_2O)_{0.5}$ | Tubule |
| NTHU-7L | $(Ch^+)_{0.7}(H_2tmdp^{2+})_{0.15}(H_2O)_{0.5}$ | Layer |
| Ch-NTHU-7L | $(Ch^+)_{1.0}(H_2O)_{0.5}$ | Layer |

TAB. 1 shows the compounds (NTHU-7, the analogues of NTHU-7, and the polymorphs of NTHU-7), the corresponding counterion species, and the structural types of the compounds. In TAB. 1, the compound in the first row is NTHU-7, wherein the corresponding counterion species, $(Ch^+)_{0.5}(H_2tmdp^{2+})_{0.25}(H_2O)_{0.5}$, essentially comprises tmdp ($Ch^+$ and crystal water molecule as well); the compound in the second row is tmdpp-NTHU-7, wherein "tmdpp" refers to 4,4'-trimethylenedipiperidine, and the mark "tmdpp-" means tmdpp is the main component in the counterion species in this row; the compound in the third row is Cs-NTHU-7, wherein "Cs-" means cesium ion ($Cs^+$) is the main component in the counterion species in this row; the compound in the fourth row is Rb-NTHU-7, wherein "Rb-" means rubidium ion ($Rb^+$) is the main component in the counterion species in this row; the compound in the fifth row is K-NTHU-7, wherein "K-" means potassium ion ($K^+$) is the main component in the counterion species in this row. The methods for manufacturing above-mentioned five compounds are similar to the method for manufacturing NTHU-7. The organic amine is substituted in turn with tmdpp, CsOH, RbOH, KOH, NaOH to prepare the above-mentioned analogues. With the same DES, five nanotubule analogues of NTHU-7 can be prepared, wherein the analogues comprising the same porous host structure but different counterion species. Generally, tmdp exists inside and outside the nanotubule of NTHU-7. However, when tmdp is at the space inside the nanotubule of NTHU-7, a better photoluminescence effect is observed. Besides, the layer polymorphs of NTHU-7 are prepared by introducing HF (0.05 mL, 1.15 mmol) into the reaction mixture for the preparation of NTHU-7. Lamellar crystals of NTHU-7L were obtained as a major-phase product. As shown in the seventh row in TAB. 1. Because the components of the counterion species corresponding to NTHU-7L are essentially identical to the counterion species corresponding to NTHU-7, the above-mentioned product is labeled as NTHU-7L for brevity. Another layer polymorph is obtained by introducing essentially the same amount of HF into the reaction mixture for the preparation of tmdpp-NTHU-7. Because no tmdpp is found in the product (only choline ions are found), so the product is labeled as Ch-NTHU-7L, as shown in the eighth row in TAB. 1. In the embodiments, the counterion species may comprise positive charge, negative charge, or the combination thereof. Besides, the solid state $^{13}C$ NMR of NTHU-7, tmdpp-NTHU-7, Cs-NTHU-7, Rb-NTHU-7, NTHU-7L, Ch-NTHU-7L are shown in FIGS. 3A through 3F, respectively.

One feature of the embodiment of the present invention is the use of $H_3PO_3$, instead of $H_3PO_4$, in the synthesis processes of preparing NTHU-7. Therefore, the bondings between metal-oxygen-phosphorus are reduced, and thus more interrupted open-frameworks are generated.

Figure 4A:
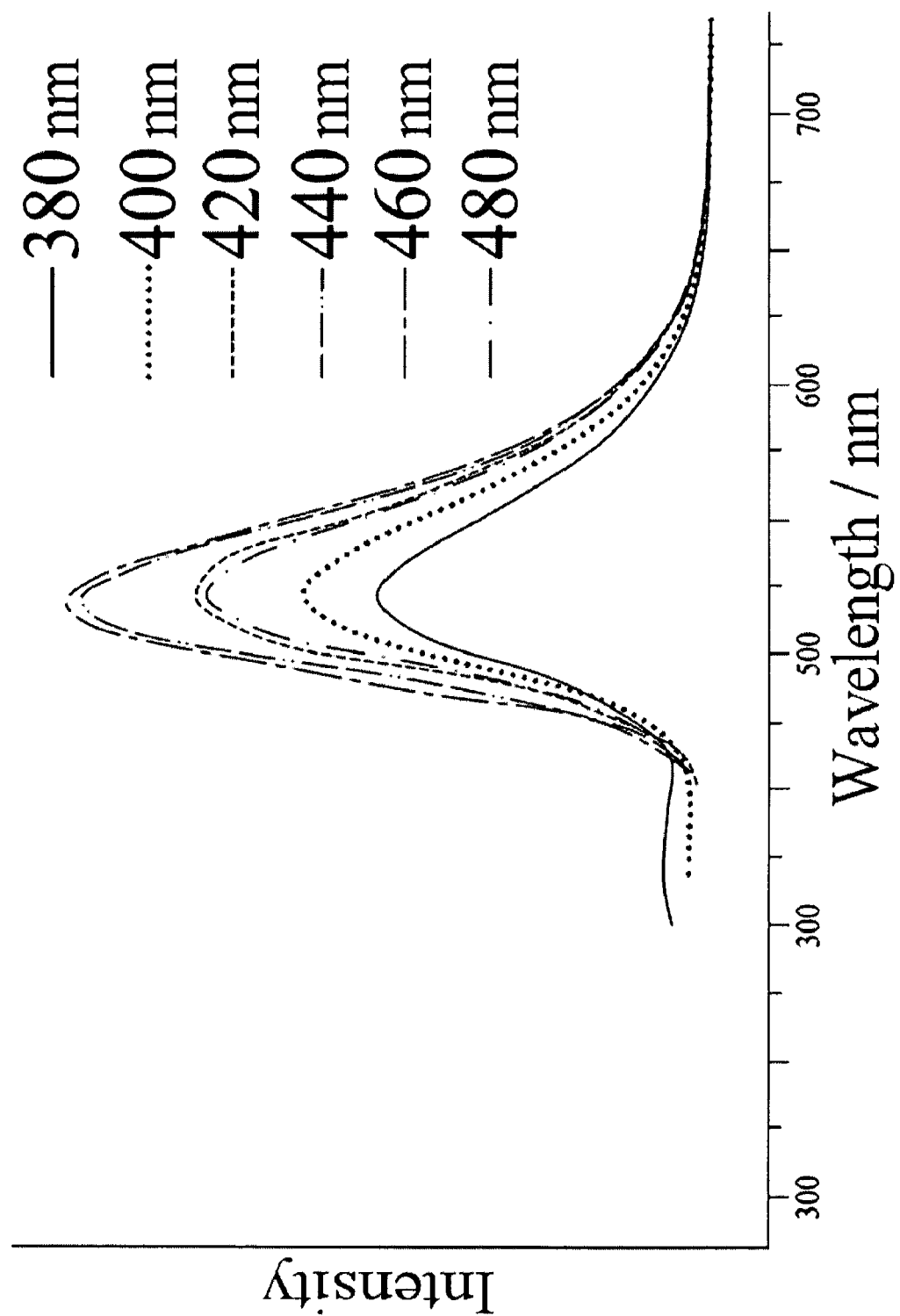
FIGS. 4A through 4D illustrate electroluminescence spectra and UV-visible diffuse reflectance spectra for NTHU-7 and the polymorphs/analogues of NTHU-7.
Figure 4B:
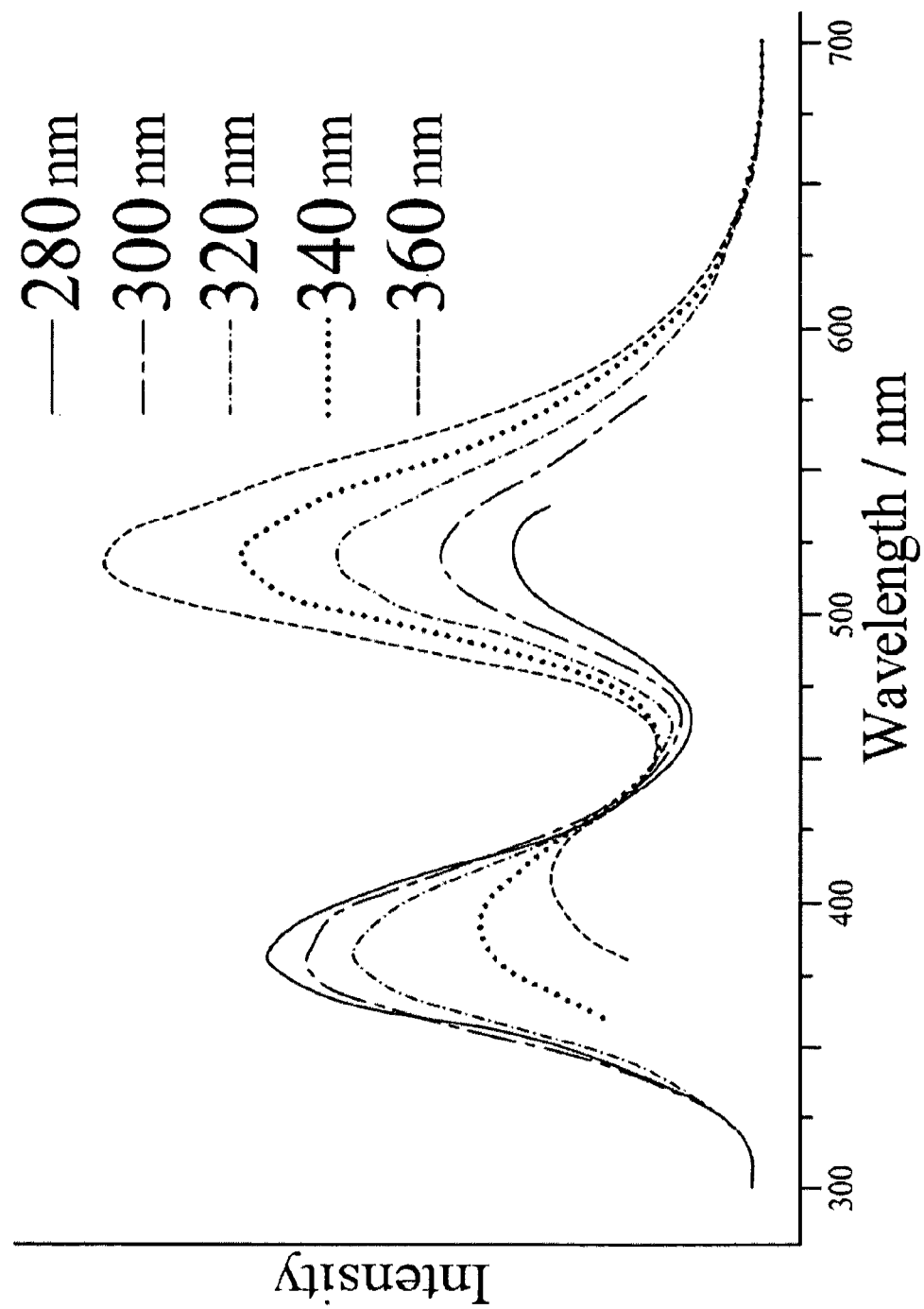
Figure 4C:
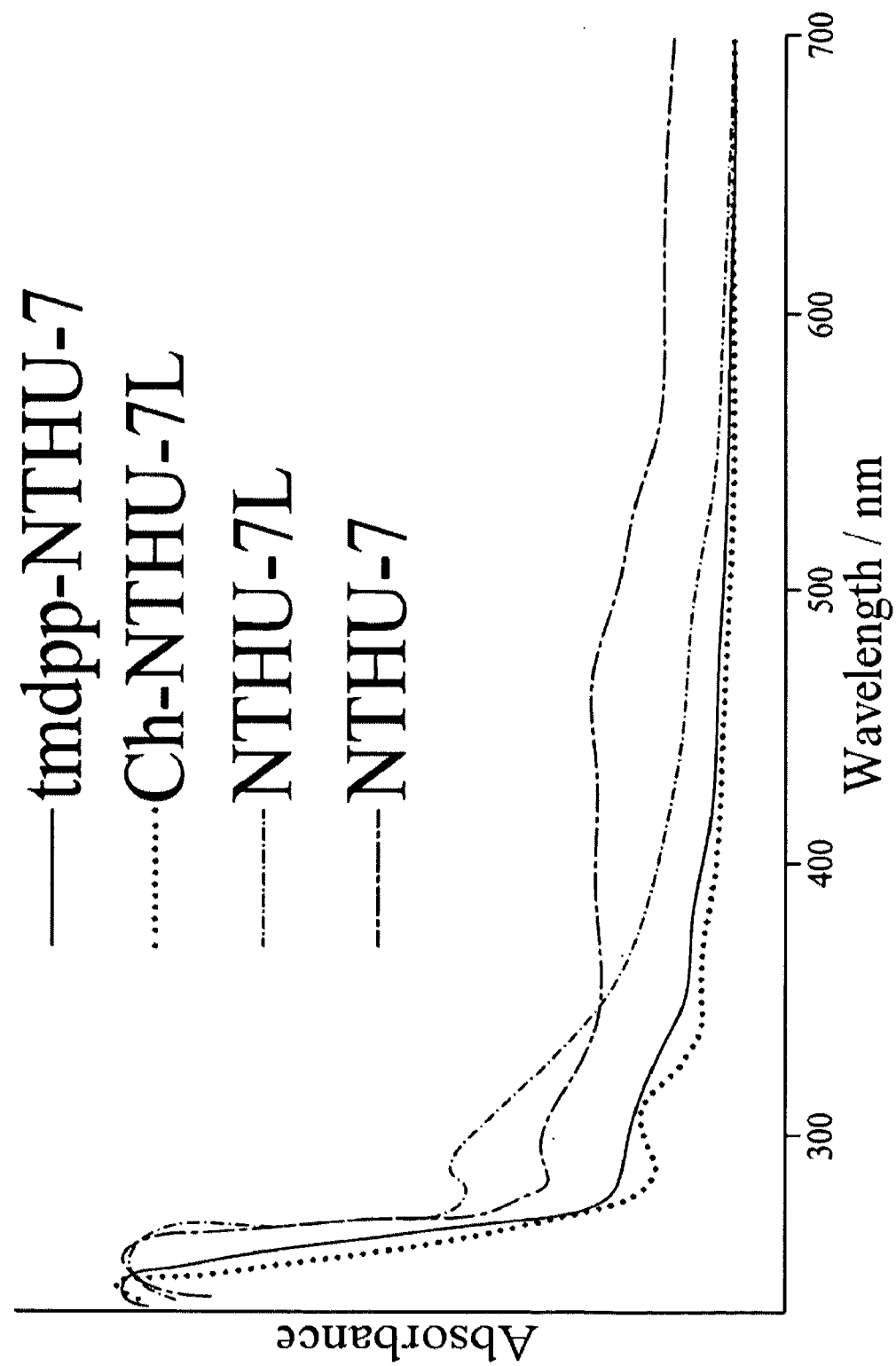
Figure 4D:
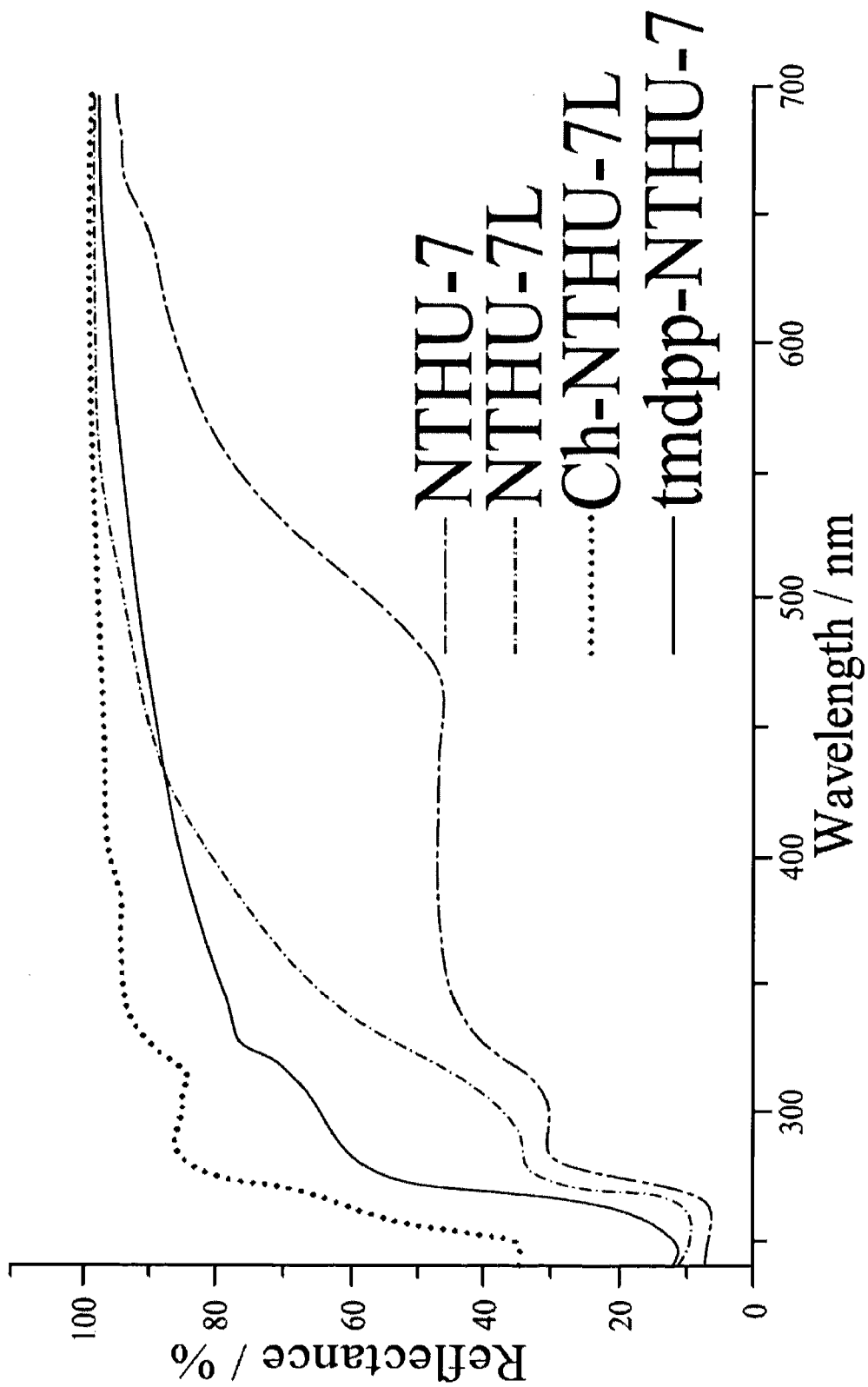

Another feature of the embodiment of the present invention is that NTHU-7 can be used as an intrinsic phosphor which provides PL property without dependency of adding conventional metal activator. The PL and UV/Vis diffuse reflectance spectra (DRS) for NTHU-7 is shown in FIGS. 4A and 4B. FIG. 4A shows the emission intensities at different visible light excitation wavelength 380 nm, 400 nm, 420 nm, 440 nm, 460 nm, and 480 nm. It is shown in FIG. 4A that the maximum intensity of the emission is detected at excitation wavelength being about 460 nm, with absolute photoluminescence quantum efficiency (PLQE) reaching 46% (not shown in figures) and Commission Internationale de l'Eclairage (CIE) coordinates at (0.26, 0.63), which indicates a yellow-green light. Besides, a strong emission with a maximum at 520 nm is observed, regardless of the excitation wavelength of visible light. In the other hand, FIG. 4B shows that the emission intensities at different UV light excitation wavelength 280 nm, 300 nm, 320 nm, 340 nm, and 360 nm. In FIG. 4B, dual emission phenomenon can be observed. In addition to the emission centered at 520 nm (about 500 to 540 nm) observed in FIG. 4A, an additional NUV emission appears centered at 380 nm (about 360 to 400 nm, CIE coordinates at (0.13, 0.31)). Further, when excitation wavelength is about 320 nm, the yellow-green and NUV emissions reached an equal intensity, which results in a green emission with CIE coordinates at (0.24, 0.45). As excitation wavelength enters the visible region, the NUV emission is red-shifted and its intensity decreases, eventually approaching zero. FIG. 4C shows the absorption curves of NTHU-7, analogues of NTHU-7, and layer polymorphs of NTHU-7, and it shows that NTHU-7 has higher absorption. FIG. 4D shows the reflectance curves of NTHU-7, analogues of NTHU-7 and layer polymorphs of NTHU-7, and it shows that NTHU-7 has lower absorption. Therefore, based on the observations in FIGS. 4C and 4D, the higher absorption and lower reflectance of NTHU-7 support that NTHU-7 has a better PL property.

Figure 5A:
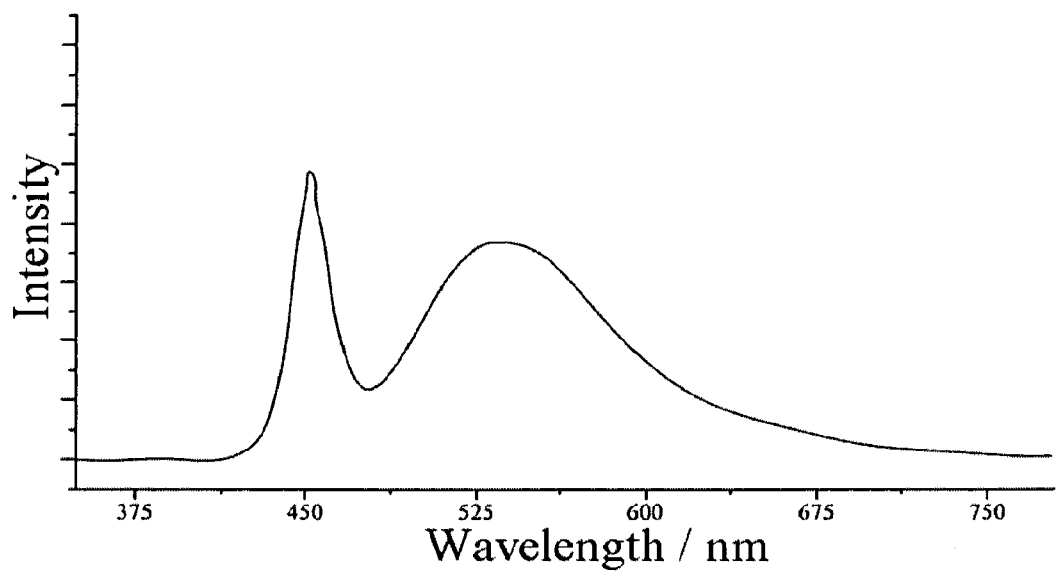
FIGS. 5A and 5B illustrate electroluminescence spectra of NTHU-7 coated LED device.
Figure 5B:
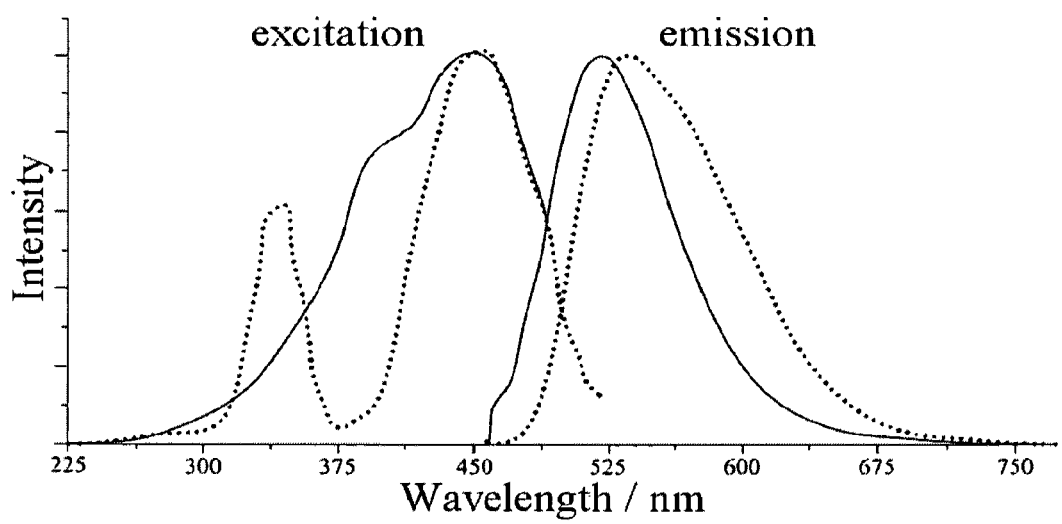

In another embodiment of the present invention, NTHU-7 is utilized as a color conversion phosphor to be coated on a light-emitting diode (LED) for manufacturing a light device or, more specifically, a LED device. The embodiment of the present invention provides a lighting device coated with porous phosphor, the lighting device comprising: at least one light source; and at least one phosphor layer formed on the at least one light source, wherein the at least one phosphor layer comprises porous phosphor (NTHU-7). In one embodiment, a near-white LED device (CIE coordinates 0.29, 0.38) is fabricated by coating NTHU-7 nanotubules on top of a GaN blue LED (450 nm), and its electroluminescence spectra is shown in FIG. 5A. Moreover, NTHU-7 could be pumped by a NUV LED (InGaN, 395 nm) chip to make a yellow-green light device (CIE coordinates 0.39, 0.54), the corresponding electroluminescence is shown in FIG. 5B. For purpose of clearly representing the wider excitation range of NTHU-7 than conventional YAG:Ce in the NUV region, the curve of YAG:Ce is showed in dotted line in FIG. 5B. Furthermore, TAB. 2 lists several conventional color conversion phosphors that can be excited by UV or blue LEDs. The structures of theses phosphors are all different with NTHU-7, and these phosphors all comprising at least one metal activator. The skilled in the art should more appreciate the features and advantages of NTHU-7 according to the embodiments of the present invention.

TABLE 2

| Phosphor | Activator | Emission Color | Excitation Wavelength in nm |
|---|---|---|---|
| YAG | $Ce^{3+}$ | yellow | 470 |
| $SrGa_2S_4$ | $Eu^{2+}$ | green | 460 |
| SrS | $Eu^{2+}$ | red | 450 |
| $(Ca,Mn)_5(PO_4)_3Cl$ | $Eu^{2+}$ | orange | 415 |
| $Sr_2Si_5N_8$ | $Eu^{2+}$ | red | 400 |
| ZnS | $Ag^+$ | blue | 400 |
| (Zn,Cd)S | $Cu^+, Al^{3+}$ | green | <400 |
| $SrAl_2O_4$ | $Eu^{2+}$ | green | 400 |
| $SrAl_{14}O_{25}$ | $Eu^{2+}$ | cyan | <00 |
| $(Y_{2-x-y}Eu_xBi_y)O_3$ | $Eu^{3+}$ | red | 360-410 |
| $Gd_2O_2S$ | $Eu^{3+}$ | red | 380 |
| $Sr_5(PO_4)_3Cl$ | $Eu^{2+}$ | blue | 375-00 |
| $BaMgAl_{10}O_{17}$ | $Eu^{2+}$ | blue | 375 |
| $YBO_3, Y_2SiO_5$ | $Ce^{3+}, Tb^{3+}$ | green | 350 |

In conclusion, the nanoporous NTHU-7 owns several features including, for example, atom-disorder-enhanced defect sites as activators, tmdp template as sensitizer, and a host with nanosized channels, whereby light emission mechanism is enhanced. However, the present invention is not limit to NTHU-7. In fact, in some embodiments of the present invention, several nanotubular analogues and layer polymorphs of NTHU-7 which are not disclosed in the prior art are also provided. In view of the teaching of the present invention, the skilled in art may make changes or modifications of the method, compound, and LED device related to NTHU-7 for adapting to some specific applications, while these changes or modifications should still be within the scope of the present invention. For example, the light emitting device made by coating NTHU-7 may widely apply to different lighting, displaying or other devices. Because NTHU-7 can be pumped by NUV and/or visible light sources, a better color rendering index (CRI) can be provided. Moreover, the detailed description of the embodiment of the present invention is not for the purpose of limiting the scope of the present invention. Therefore, the scope of the present invention is intended to be defined by the following claims and the equivalents.

What is claimed is:

1. A porous phosphor, comprising the following composition:

$(A)_{1-2x}(B)_x[M_2(HPO_3)_2(C_2O_4)(OH)(H_2O)] \cdot y(H_2O)$;
wherein 0<x<0.5; 0<y<2; A is choline ion; B is protonated organic amine; and M is $13^{th}$ group metal ion.

2. The porous phosphor as claim 1, wherein M is gallium or aluminum ion.

3. The porous phosphor as claim 1, wherein said protonated organic amine is 4,4'-trimethylenedipyridinium.

4. A method for manufacturing porous phosphor, said method comprising:

preparing solution comprising deep eutectic solvent, $13^{th}$ group metal source, phosphorous acid source, and organic amine source; and heating said solution at temperature about 140 to 180° C. to get product;

wherein said deep eutectic solvent comprises mixture of choline chloride and oxalic acid dihydrate, and an amount of water within said oxalic acid dihydrate is about 13.5 wt %; said porous phosphor comprising the following composition:

$(A)_{1-2x}(B)_x[M_2(HPO_3)_2(C_2O_4)(OH)(H_2O)] \cdot y(H_2O)$;
wherein 0<x<0.5; 0<y<2; A is choline ion; B is protonated organic amine; and M is $13^{th}$ group metal ion.

5. The method as claim 4, wherein molar ratio of said choline chloride and said oxalic acid dihydrate is about 1:1.

6. The method as claim 4, wherein said $13^{th}$ group metal source is gallium oxide or aluminum oxide.

7. The method as claim 4, wherein said protonated organic amine is 4,4'-trimethyenedipyridinium.

8. A lighting device coated with porous phosphor, said lighting device comprising:
   at least one light source; and
   at least one phosphor layer formed on said at least one light source, wherein said at least one phosphor layer comprises porous phosphor comprising the following composition:
   $(A)_{1-2x}(B)_x[M_2(HPO_3)_2(C_2O_4)(OH)(H_2O)] \cdot y(H_2O)$;
   wherein $0<x<0.5$; $0<y<2$; A is choline ion; B is protonated organic amine; and M is $13^{th}$ group metal ion.

9. The lighting device as claim 8, wherein M is gallium or aluminum ion.

10. The lighting device as claim 8, wherein said protonated organic amine is 4,4'-trimethylenedipyridinium.

11. The lighting device as claim 8, wherein wavelength of said at least one light source is about 460 nm, and Commission Internationale del'Eclairage (CIE) coordinate of said lighting device is at about (0.26, 0.63).

12. The lighting device as claim 8, wherein wavelength of said at least one light source is about 320 nm, and CIE coordinate of said lighting device is at about (0.24, 0.45).

13. The lighting device as claim 8, wherein wavelength of said at least one light source is about 450 nm, and CIE coordinate of said lighting device is at about (0.29, 0.38).

14. The lighting device as claim 8, wherein wavelength of said at least one light source is about 395 nm, and CIE coordinate of said lighting device is at about (0.39, 0.54).

* * * * *